US008873521B2

(12) United States Patent
Miller et al.

(10) Patent No.: US 8,873,521 B2
(45) Date of Patent: Oct. 28, 2014

(54) METHODS OF DETERMINING INFORMATION REGARDING REMOTE USER TERMINALS AND RELATED SYSTEMS AND COMPUTER PROGRAM PRODUCTS

(75) Inventors: Adam Miller, Ramlösa (SE); Henrik Bengtsson, Lund (SE); Johan Apelqvist, Hjärup (SE); David Burstrom, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1101 days.

(21) Appl. No.: 11/774,122

(22) Filed: Jul. 6, 2007

(65) Prior Publication Data

US 2009/0010406 A1  Jan. 8, 2009

(51) Int. Cl.
*H04W 4/00* (2009.01)
*H04L 29/06* (2006.01)
*H04L 29/08* (2006.01)

(52) U.S. Cl.
CPC ........... *H04L 29/06027* (2013.01); *H04L 67/24* (2013.01); *H04L 65/1069* (2013.01)
USPC ........... 370/338; 370/344; 370/349; 455/461; 455/464

(58) Field of Classification Search
USPC ................... 370/338, 344, 349; 455/461, 464
See application file for complete search history.

(56) References Cited

U.S. PATENT DOCUMENTS

| 6,408,063 | B1 | 6/2002 | Slotte et al. | |
|---|---|---|---|---|
| 6,466,782 | B2 * | 10/2002 | Ishikawa et al. | 455/412.2 |
| 6,856,677 | B2 * | 2/2005 | Leijonhufvud | 379/210.01 |
| 6,973,309 | B1 * | 12/2005 | Rygula et al. | 455/436 |
| 2002/0089939 | A1 * | 7/2002 | Foti | 370/265 |
| 2004/0252674 | A1 * | 12/2004 | Soininen et al. | 370/352 |
| 2006/0114882 | A1 * | 6/2006 | Mills | 370/352 |
| 2007/0002831 | A1 * | 1/2007 | Allen et al. | 370/352 |

FOREIGN PATENT DOCUMENTS

| EP | 1 737 192 A1 | 8/2005 |
|---|---|---|
| EP | 1 720 324 A1 | 11/2006 |
| WO | WO 2006/010525 A1 | 2/2006 |
| WO | WO 2007/147948 A1 | 12/2007 |

OTHER PUBLICATIONS

Invitation to Pay Additional Fees and Partial International Search Report for PCT/EP2007/064227; date of mailing Apr. 10, 2008 (6 pages).

International Search Report and Written Opinion of International Application No. PCT/EP2007/064227 mailed Jul. 10, 2008 (20 pages).

(Continued)

*Primary Examiner* — Wayne Cai
*Assistant Examiner* — Chuck Huynh
(74) *Attorney, Agent, or Firm* — Myers Bigel Sibley & Sajovec, PA (57) ABSTRACT

A method of determining user terminal information may include initiating a communication at a first user terminal between the first user terminal and a second user terminal using a telephone number of the second user terminal. Information regarding the second user terminal may then be received at the first user terminal from the second user terminal during the communication over a non-voice channel without opening a voice channel between the first and second user terminals. Related systems and computer program products are also discussed.

19 Claims, 4 Drawing Sheets

(56) References Cited

OTHER PUBLICATIONS

Global System for Mobile Communications (3GPP) ETSI TS 123 067 V7.1.0 "Digital Cellular Telecommunications System (Phase 2+); Universal Mobile Telecommunications System (UMTS); Enhanced Multi-Level Precedence and Pre-Emption Service (eMLPP); Stage 2" 27 pages (2007).
Chinese Office Action (11 pages) corresponding to Chinese Patent Application No. 200780053669.5; Issue Date: Feb. 29, 2012.
Chinese Decision of Rejection Corresponding to Chinese Patent Application No. 200780053669.5; Issuing Date: Jan. 15, 2013; Foreign Text, 5 Pages, English Translation Thereof, 7 Pages.
Chinese Office Action Corresponding to Chinese Patent Application No. 200780053669.5; Issuing Date: Jun. 27, 2012; Foreign Text, 4 Pages, English Translation Thereof, 2 Pages.
European Office Action Corresponding to European Patent Application No. 07 857 848.1; Date Mailed: Jul. 10, 2013; (5 Pages).

* cited by examiner

METHODS OF DETERMINING INFORMATION REGARDING REMOTE USER TERMINALS AND RELATED SYSTEMS AND COMPUTER PROGRAM PRODUCTS

FIELD OF THE INVENTION

The present invention relates to the field of electronics, and more particularly to user terminals providing communications and related systems and computer program products.

BACKGROUND

A user terminal, such as a mobile radioterminal, may provide a diversity of functionalities. A mobile user terminal, for example, may provide communications functionalities such as cellular circuit switched radiotelephone communication, e-mail communication, instant messaging communication, peer-to-peer Voice-over-Internet-Protocol (VoIP) communication, Internet browsing, short message service (SMS) communication, multimedia message service (MMS) communication, Internet chat communication, etc. Accordingly, different modes of communication may be provided between the same user terminals.

SUMMARY

According to some embodiments of the present invention, a method of determining user terminal information may include initiating a communication at a first user terminal between the first user terminal and a second user terminal using a telephone number of the second user terminal. Information regarding the second user terminal may then be received at the first user terminal during the communication over a non-voice channel from the second user terminal without opening a voice channel between the first and second user terminals.

The information regarding the second user terminal may include a user status profile designated by a user of the second user terminal (such as text designated by a user of the second user terminal), an Internet Protocol (IP) address, and/or an acknowledgement that the second user terminal supports an Internet Protocol (IP) application (such as an Internet text chat application, a peer-to-peer Voice-over-Internet-Protocol application, and/or a multimedia message service). Moreover, the telephone number of the second user terminal may include a mobile serial number (MSN) of the second user terminal.

The information regarding the second identification may include an Internet Protocol (IP) address of the second user terminal, and a second communication between the first and second user terminals may be automatically initiated responsive to receiving the Internet Protocol (IP) address. More particularly, the second communication may be automatically initiated using the Internet Protocol (IP) address of the second user terminal without requiring user input at the first user terminal after receiving the second identification. Moreover, the first communication may be a circuit switched (CS) communication, and the second communication may be a packet switched communication.

The non-voice channel may be a signaling channel provided during a circuit switched (CS) communication such as a user-to-user signaling (UUS) channel. Moreover, the communication may be a circuit switched (CS) telephone communication, and after receiving the information regarding the second user terminal during the circuit switched (CS) telephone communication, the circuit switched telephone communication may be terminated without alerting a user of the second user terminal.

According to some other embodiments of the present invention, a method of communication between first and second user terminals may include initiating a first communication between the first and second user terminals using a first identification of the second user terminal. A second identification of the second user terminal may be received at the first user terminal over a non-voice channel during the first communication, and the first and second identifications may be different. A second communication between the first and second user terminals may be initiated using the second identification of the second user terminal.

The first and second identifications of the second user terminal may be provided according to different formats. For example, the first identification of the second user terminal may be a telephone number (such as a mobile serial number or MSN) of the second user terminal, and the second identification of the second user terminal may be an Internet Protocol (IP) address. Moreover, the non-voice channel may be a signaling channel (such as a user-to-user signaling or UUS channel) provided during a circuit switched (CS) communication.

The first communication may be a circuit switched communication, and the second communication may be a packet switched communication. For example, the second communication may be an Internet text chat communication, a peer-to-peer (P-to-P) Voice-over-Internet-Protocol (VoIP) communication, and/or a multimedia message service (MMS) communication.

The first identification of the second user terminal may include a telephone number of the second user terminal, and the first communication may be a circuit switched telephone communication. After receiving the second identification of the second user terminal during the first circuit switched telephone communication, the first circuit switched telephone communication may be terminated without alerting a user of the second user terminal. Moreover, initiating the second communication may include automatically initiating the second communication responsive to receiving the second identification without requiring user input at the first user terminal after receiving the second identification.

The first identification may be a first telephone number of the second user terminal, and initiating the first communication may include providing the first telephone number and accepting selection of a non-telephone communication using the first telephone number. At another time, the first user terminal may accept selection of a telephone communication using a second telephone number of a third user terminal, and a telephone voice communication may be established with the third user terminal.

According to still other embodiments of the present invention, a method of making a telephone call may include providing a telephone number at a first user terminal wherein the telephone number is for a second user terminal, and accepting user selection of one of a normal call or a priority call. When the priority call selection is made, a call to the second user terminal is initiated using the telephone number so that a priority designation is provided at the second user terminal before the call is answered at the second user terminal. When the normal call selection is made, a call to the second user terminal is initiated using the telephone number so that the priority designation is not provided at the second user terminal. The priority designation may be transmitted from the first user terminal to the second user terminal over a paging channel and/or a signaling channel (such as a UUS channel), and/or the priority designation may include a text message.

According to more embodiments of the present invention, a user terminal may include a transceiver and a processor coupled to the transceiver. The transceiver may be configured to transmit/receive communications over a communications network. The processor may be configured to initiate a communication through the transceiver with another user terminal using a telephone number of the other user terminal, and to receive information regarding the other user terminal through the transceiver during the communication over a non-voice channel without opening a voice channel between the user terminals.

According to still more embodiments of the present invention, a user terminal may include a transceiver and a processor coupled to the transceiver. The transceiver may be configured to transmit/receive communications over a communication network. The processor may be configured to initiate a first communication through the transceiver with another user terminals using a first identification of the other user terminal, and to receive a second identification of the other user terminal through the transceiver over a non-voice channel during the first communication with the first and second identifications being different. The processor may also be configured to initiate a second communication with the other user terminal using the second identification of the other user terminal.

According to yet more embodiments of the present invention, a user terminal may include a transceiver and a processor coupled to the transceiver. The transceiver may be configured to transmit/receive communications over a communication network. The processor may be configured to accept a telephone number for another user terminal and to accept user selection of one of a normal call or a priority call. When the priority call selection is made, the processor may be configured to initiate a call to the other user terminal using the telephone number so that a priority designation is provided at the other user terminal before the call is answered at the other user terminal. When the normal call selection is made, the processor may be configure to initiate a call to the other user terminal using the telephone number so that the priority designation is not provided at the other user terminal.

According to still other embodiments of the present invention, a computer program product may be configured to obtain information for a remote user terminal, and the computer program product may include a computer readable medium having computer readable program code embodied therein. More particularly, the computer readable program code may include computer readable program code configured to initiate a communication at a first user terminal between the first user terminal and a second user terminal using a telephone number of the second user terminal. In addition, the computer readable program code may include computer readable program code configured to receive information regarding the second user terminal at the first user terminal during the communication over a non-voice channel from the second user terminal without opening a voice channel between the first and second user terminals.

According to still more embodiments of the present invention, a computer program product may be configured to provide communications, and the computer program product may include a computer readable medium having computer readable program code embodied therein. More particularly, the computer readable program code may include computer readable program code configured to initiate a first communication between the first and second user terminals using a first identification of the second user terminal. In addition, the computer readable program code may include computer readable program code configured to receive a second identification of the second user terminal at the first user terminal over a non-voice channel during the first communication wherein the first and second identifications are different. The computer readable program code may also include computer readable program code configured to initiate a second communication between the first and second user terminals using the second identification of the second user terminal.

According to still other embodiments of the present invention, a computer program product may be configured to establish a telephone call, and the computer program product may include a computer readable medium having computer readable program code embodied therein. More particularly, the computer readable program code may include computer readable program code configured to provide a telephone number at a first user terminal wherein the telephone number is for a second user terminal. In addition, the computer readable program code may include computer readable program code configured to accept user selection of one of a normal call or a priority call. The computer readable program code may also include computer readable program code configured to initiate a call to the second user terminal using the telephone number so that a priority designation is provided at the second user terminal before the call is answered at the second user terminal when the priority call selection is made. The computer readable program code may further include computer readable program code configured to initiate a call to the second user terminal using the telephone number so that the priority designation is not provided at the second user terminal when the normal call selection is made.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawing, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first frequency below could be termed a second frequency, and similarly, a second frequency may be termed a first frequency without departing from the teachings of the present invention. As used herein, the term "and/or" includes any and all combinations of one or more of the associated listed items. The symbol "/" is also used as a shorthand notation for "and/or".

Various embodiments of the present invention are described below with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

Figure 1:
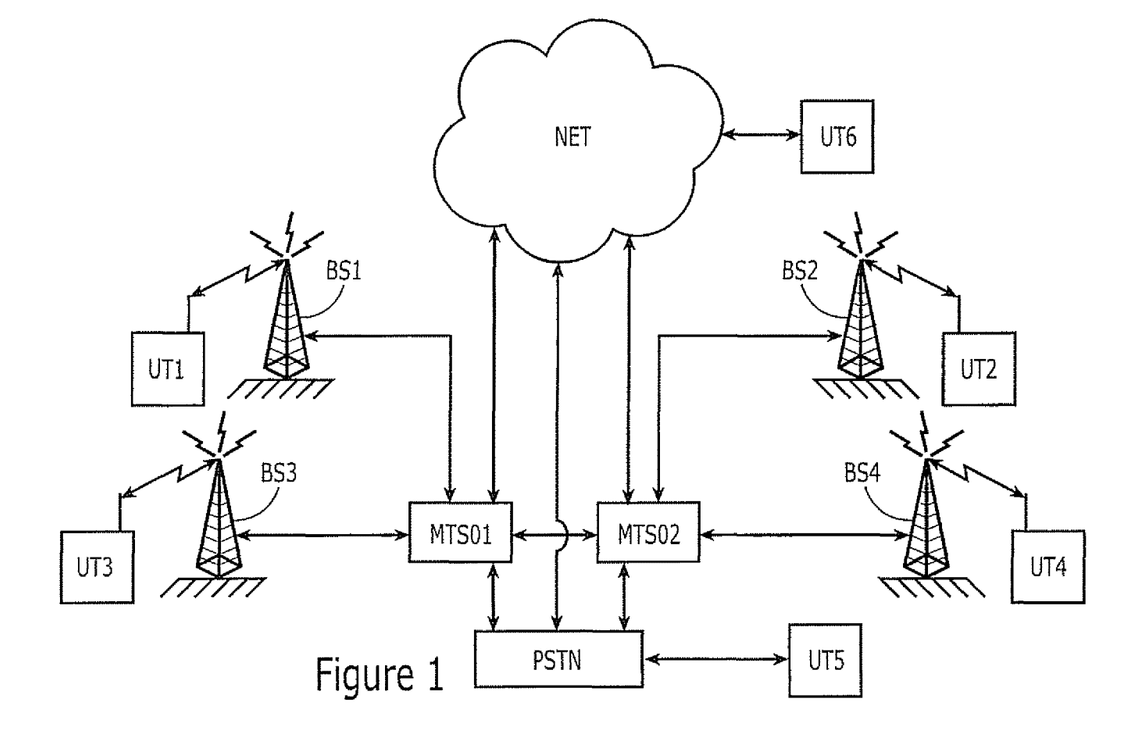
FIG. 1 is a block diagram illustrating communications systems including user terminals according to some embodiments of the present invention.

FIG. 1 is a block diagram illustrating communications systems including user terminals according to some embodiments of the present invention. A cellular radiotelephone communications system, for example, may include a plurality of base stations BS1-BS4 and a plurality of mobile telephone switching offices MTSO1-MTSO4 supporting communications for a plurality of user terminals UT1-UT4. Moreover, the radiotelephone communications system may be coupled to a public switched telephone network PSTN and/or a data network NET (such as the Internet) to provide communications between user terminals UT1, UT2, UT3, UT4, UT5, and/or UT6.

Each of the user terminals UT1-UT4 may be a mobile user terminal providing one or more of cellular radiotelephone communications, peer-to-peer Voice-over-Internet-Protocol (VoIP) communications (such as Skype™ communications), Internet chat communications, short message service (SMS) communications, multimedia message service (MMS) communications, Internet browsing, text messaging communication, e-mail communications, etc. User terminal UT1, for example, may provide cellular radiotelephone communications, peer-to-peer VoIP communications, Internet chat communications, SMS communications, MMS communications, text messaging communications, e-mail communications, and Internet browsing, and operations of user terminal UT1 will be discussed in greater detail below with reference to the flow charts of FIGS. 2-4 and the block diagram of FIG. 5.

Figure 5:
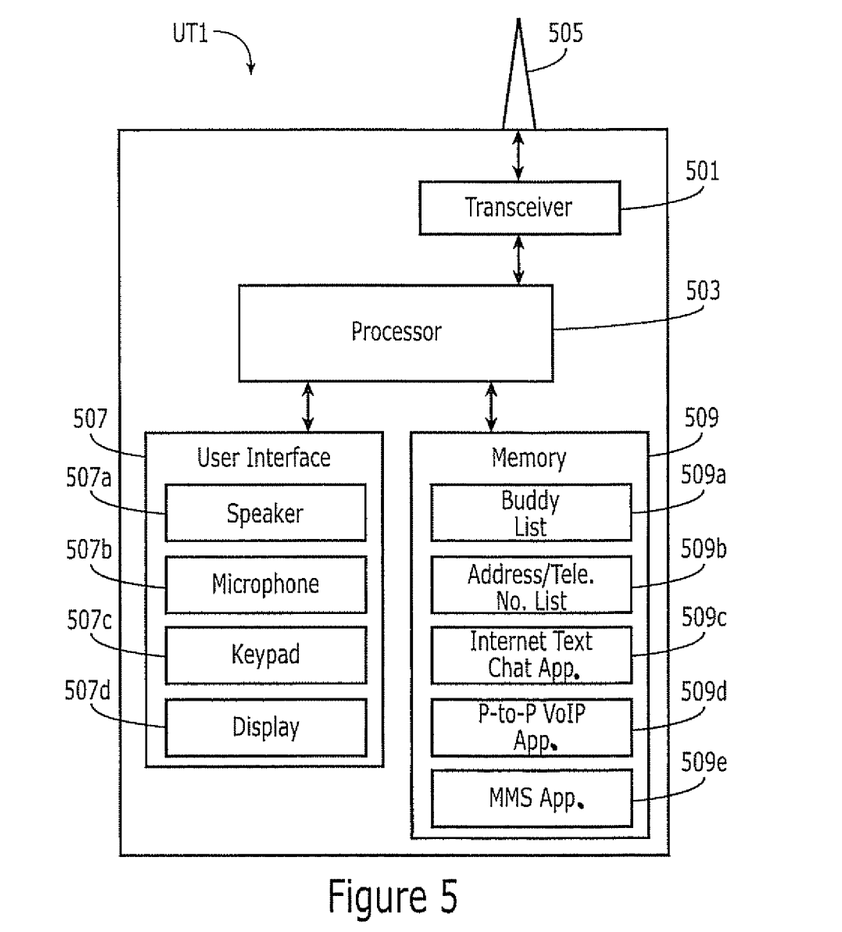
FIG. 5 is a block diagram of a user terminal according to some embodiments of the present invention.

FIG. 5 is a block diagram showing user terminal UT1 according to some embodiments of the present invention. User terminal UT1 may include a transceiver 501 coupled between a processor 503 and an antenna 505, with a user interface 507 and a memory 509 also coupled to the processor 503. The user interface 507 may include, for example, a speaker 507a, a microphone 507b, a keypad 507c, a display 507d, etc., and the memory may include, for example, a buddy list 509a, an address/telephone number list 509b, an Internet text chat application 509c, a P-to-P VoIP application 509d, an MMS application 509e, etc. The user terminal UT1 may thus be a wireless mobile user terminal that transmits/receives communications through the transceiver 501 and antenna 505. According to other embodiments of the present invention, the user terminal UT1 may be a wired user terminal such that transceiver 501 is coupled to a wired interface without an antenna.

According to some embodiments of the present invention, the processor 503 of user terminal UT1 may be configured to initiate a communication between the user terminal UT1 and another user terminal (such as user terminal UT2, UT3, UT4, UT5, or UT6) using a telephone number of the other user terminal. The first communication, for example, may be a circuit switched (CS) communication provided over the transceiver 501, the antenna 505, the base station BS1, and mobile telephone switching office MTSO1. The other user terminal may respond during the communication with information regarding the other user terminal, and the information regarding the other user terminal may be received at the processor 501 through the antenna 505 and the transceiver 501 of the first user terminal UT1 during the communication. More particularly, the information regarding the other user terminal may be received over a non-voice channel (e.g., over a control channel) from the other user terminal without opening a voice channel between the user terminals.

The information regarding the other user terminal may include a user status profile that is provided by processor 503 on display 507d of user terminal UT1 or stored in buddy list 509a. The information regarding the other user terminal may include an Internet Protocol (IP) address that is stored by processor 503 in buddy list 509a or address/telephone number list 509b, or that is used by processor 503 to initiate an Internet Protocol (IP) communication with the other user terminal using, for example, Internet text chat application 509c, P-to-P VoIP application 509d, and/or MMS application 509e. The information regarding the other user terminal may include an acknowledgement that the other user terminal supports a particular Internet Protocol application, and the acknowledgement may be stored by processor 503 in buddy list 509a.

According to some other embodiments of the present invention, the processor 503 of user terminal UT1 may initiate a first communication with another user terminal using a first identification (such as a telephone number) of the other user terminal through the transceiver 501, antenna 505, the base station BS1, and mobile telephone switching office MTSO1. The other user terminal may respond during the first communication with a second identification of the other user terminal (such as an Internet Protocol address), and the second identification of the other user terminal may be received at the processor 501 through the antenna 505 and the transceiver 501 of the first user terminal UT1 during the first communication. More particularly, the second address of the other user terminal may be received over a non-voice channel without opening a voice channel between the user terminals.

The processor 503 of user terminal UT1 may then initiate a second communication (through the transceiver 501 and antenna 505) with the other user terminal using the second identification of the other user terminal, for example, using Internet text chat application 509c, P-to-P VoIP application 509d, and/or MMS application 509e.

More particularly, the first communication may be a circuit switched (CS) communication, and the second communication may be a packet switched communication (such as an Internet Protocol communication). Moreover, the second identification of the other user terminal may be received during the first circuit switched communication using a signaling channel such as a UUS channel.

The processor 501 of user terminal UT1 may thus use a telephone number to initiate a circuit switched telephone voice communication or an Internet Protocol communication. According to some embodiments of the present invention, a user of the user terminal UT1 may provide a telephone number for the processor 503, for example, by selecting the telephone number from the address/telephone number list 509b of memory 509, and/or by entering the telephone number through keypad 507c (or other input device) of user interface 507. The user of the user terminal UT1 may then select one type of communication to be initiated, for example, by selecting one of a plurality of function keys of keypad 507c and/or selecting from a graphic menu provided on display 507d. After the telephone number has been provided, the user may thus select a circuit switched voice telephone communication, an Internet text chat communication (using Internet text chat application 509c), a P-to-P VoIP communication (using P-to-P VoIP application 509d), and/or a MMS communication (using MMS application 509e).

According to still other embodiments of the present invention, a user of user terminal UT1 may designate a priority when initiating a voice telephone communication. The user may provide a telephone number for processor 503 of user terminal UT1 with the telephone number identifying another user terminal being called. The processor may then accept user selection (through user interface 507) of one of a normal call or a priority call. If the priority call selection is made, the processor 503 may initiate a call to the other user terminal using the telephone number so that a priority designation is provided at the other user terminal before the call is answered at the second user terminal. If the normal call selection is made, the processor 503 may initiate a call to the other user terminal using the telephone number so that the priority designation is not provided at the other user terminal. Accordingly, priority designation (or lack thereof) may be used by the user of the other user terminal being called to decide whether to answer the call or not.

Figure 2:
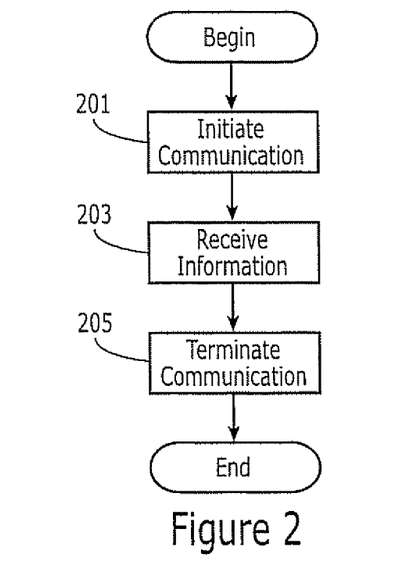
FIGS. 2-4 are flow charts illustrating operations of user terminals according to some embodiments of the present invention.

Accordingly, to some embodiments of the present invention illustrated in the flow chart of FIG. 2, the user terminal UT1 may receive information (such as capabilities information) from another user terminal using a telephone number of the other user terminal. The received information may then be used to establish subsequent communications with the other user terminal according to the capabilities of the other user terminal. The user terminal UT2, for example, may support only cellular radiotelephone communications and MMS communications; the user terminal UT3 may support only cellular radiotelephone communications and peer-to-peer VoIP communications; and the user terminal UT4 may support only cellular radiotelephone communication and Internet chat applications. The user terminal UT5 may be a conventional wire line telephone supporting only conventional wire line telephone communications over PSTN; and the user terminal UT6 may be a computing device supporting peer-to-peer VoIP communications over the network NET using an IP address and server-client VoIP communications using a telephone number.

More particularly, the user terminal UT1 may initiate a communication with another one of the user terminals UT2-UT6 using a telephone number of the other user terminal at block 201. Responsive to receiving the communication, the other user terminal may respond with information regarding the other user terminal, and the user terminal UT1 may receive information regarding the second user terminal during the communication over a non-voice channel at block 203. Moreover, the information may be received over the non-voice channel without opening a voice channel between the user terminals.

More particularly, the non-voice channel may be a signaling channel provided during a circuit switched (CS) telephone communication, such as a user-to-user signaling (UUS) channel. In addition, the circuit switched telephone communication may be terminated at block 205 without alerting a user of the other user terminal after receiving the information regarding the other user terminal at user terminal UT1 during the circuit switched (CS) telephone communication.

The information regarding the other user terminal may include a user status profile designated by a user of the other user terminal, and the user status profile may include a text message (e.g., "In meeting", "Busy", "Unavailable", "Sad", "Happy", etc.) designated by the user of the other user terminal. The user of the other user terminal may select from one of a plurality of text messages stored in memory, or the user of the other user terminal may enter a text message using a keypad or other input device on the other user terminal. The designated user status profile may thus be automatically provided by the other user terminal (corresponding to the telephone number used to initiate the communication at block 201) to the user terminal UT1 at block 203 without the user of the other user terminal being made aware of the communication.

If the user terminal UT1 attempts to initiate a voice telephone call with another user terminal (corresponding to the telephone number) that is busy or in a do-not-disturb (DND) mode, the designated status profile of the other user terminal can be transmitted to the user terminal UT1 over the non-voice channel instead of or in addition to a busy signal. For example, a user of the other user terminal may set a DND mode with a text status profile of "In Meeting Till 4:00." The text status profile will be returned to the user terminal UT1 at block 203 so that a user of the initiating user terminal UT1 will know to call back after 4:00.

According to some embodiments of the present invention, a user of user terminal UT1 may choose between different kinds of communications at block 201. A telephone number may be entered into the user terminal UT1 and/or selected from memory of the user terminal UT1, and one of a plurality of communications functions may be selected (using different function keys, graphic menus, etc.) for use with the telephone number. If a telephone call function is selected, a voice telephone communication may be initiated so that a user of the other user terminal (corresponding to the telephone number) is alerted (using a ring, ring-tone, vibrate, etc.) and a voice telephone communication may be initiated. If a profile status function is selected, a communication to the other user terminal may be initiated at block 201 using the telephone number so that the profile status of the other user terminal may be received at block 203, and the communication can be terminated at block 205 without alerting the user of the other user terminal.

Embodiments of the present invention shown in FIG. 2 may be used to query groups of other user terminals for status profile information. For example, the user terminal UT1 may query a plurality of other user terminals (e.g., UT2-UT6) designated in a list (such as a buddy list) in memory of the user terminal UT1. Accordingly, current status profile information for a plurality of other user terminals may be maintained in memory of the user terminal UT1. For example, a buddy list saved in memory of user terminal UT1 may include telephone numbers and additional information (including status profiles) for the other user terminals UT2-UT6. Communications to the other user terminals UT2-UT6 may be initiated at block 201 by the user terminal UT1 using the telephone numbers from the buddy list. The communications may be initiated at block 201 manually in response to user input at the user terminal UT1 and/or automatically (e.g., at timed intervals, on power up, etc.). The other user terminals UT2-UT6 may respond with respective status profile information that is received over non-voice channels at user terminal UT1 at block 203, and the user terminal UT1 can update the buddy list with the current status profiles received from the other user terminals UT2-UT6. The communications may be terminated at block 205 without alerting users of the other user terminals UT2-UT6. Accordingly, current status profile information of a buddy list at user terminal UT1 may be maintained automatically.

Embodiments of the present invention shown in FIG. 2 may be used to obtain an Internet Protocol (IP) address for another user terminal, and/or to determine if another user terminal supports an Internet Protocol (IP) application (e.g., an Internet text chat application, a peer-to-peer Voice-over-Internet-Protocol (VoIP) application, a multimedia message service (MMS) application, etc.). This information may be used to launch an Internet Protocol (IP) communication with the other user terminal and/or to update a buddy list as discussed above.

The user terminal UT1 may initiate a communication with user terminal UT2 at block 201, and at block 203, the user terminal UT1 may receive an acknowledgement that user terminal UT2 includes an MMS application supporting MMS communications and/or an IP address for the MMS application of the user terminal UT2. The user terminal UT1 may initiate a communication with user terminal UT3 at block 201, and at block 203, the user terminal UT1 may receive an acknowledgement that user terminal UT3 includes a peer-to-peer (P-to-P) Voice-over-Internet-Protocol (VoIP) application supporting P-to-P VoIP communications and/or an IP address for the P-to-P VoIP application of the user terminal UT3. The user terminal UT1 may initiate a communication with user terminal UT4 at block 201, and at block 203, the user terminal UT1 may receive an acknowledgement that user terminal UT4 includes an Internet text chat application supporting Internet text chat communications and/or an IP address for the Internet text chat application of the user terminal UT4.

The user terminal UT1 may initiate a communication with user terminal UT5 at block 201, and at block 203, the user terminal UT1 may receive a response that the user terminal UT5 does not support any Internet applications. The user terminal UT1 may initiate a communication with user terminal UT6 at block 201, and at block 203, the user terminal UT1 may receive an acknowledgement that user terminal UT6 includes P-to-P VoIP application supporting P-to-P VoIP communications and/or an IP address for the P-to-P VoIP application of the user terminal UT6. As discussed in greater detail below with respect to the flow chart of FIG. 3, operations of FIG. 2 may be used to obtain an Internet Protocol (IP) address of another user terminal, and then, an Internet Protocol (IP) communication between the two user terminals may be initiated.

Figure 3:
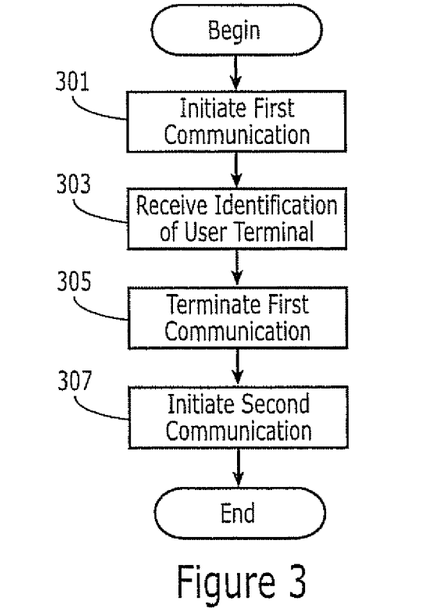

According to embodiments of the present invention shown in the flow chart of FIG. 3, a user terminal UT1 may initiate a first communication (such as a circuit switched communication) with another user terminal (such as user terminal UT2, UT3, UT4, UT5, and/or UT6) using a first identification of the other user terminal at block 301. The other user terminal (corresponding to the first identification) may respond by transmitting a second identification of the other user terminal over a non-voice channel during the first communication, and the second identification may be received over the non-voice channel at the user terminal UT1 at block 303.

The first and second identifications of the other user terminal may be provided according to different formats, and more particularly, the first identification may be a telephone number (such as a mobile serial number or MSN), and the second identification may be an Internet Protocol (IP) address. Moreover, the first communication may be a circuit switched (CS) telephone communication, and the second identification may be received at the user terminal UT1 over a circuit switched signaling channel such as a user-to-user signaling (UUS) channel.

After receiving the second identification of the other user terminal at user terminal UT1 during the first communication at block 303, the first communication may be terminated at block 305 without alerting a user of the other user terminal. The user terminal UT1 may then initiate a second communication (such as a packet switched and/or Internet Protocol communication) with the other user terminals using the second identification of the other user terminal at block 307. Moreover, the user terminal UT1 may automatically initiate the second communication responsive to receiving the second identification without requiring user input at the user terminal UT1 after receiving the second identification.

According to some embodiments of the present invention, a user of user terminal UT1 may choose between different kinds of communications at block 301. A telephone number may be entered into the user terminal UT1 and/or selected from memory of the user terminal UT1, and one of a plurality of communications functions may be selected (using different function keys, graphic menus, etc.) for use with the telephone number. If a telephone call function is selected, a voice telephone communication may be initiated so that a user of the other user terminal (corresponding to the telephone number) is alerted (using a ring, ring-tone, vibrate, etc.) and a voice telephone communication may be initiated.

If a non-telephone communication (such as an Internet Protocol communication) is selected at block 301, operations of blocks 303, 305, and 307 may be performed at user terminal UT1 as discussed above to obtain an IP address for the another user terminal (corresponding to the telephone number) and then establish an Internet Protocol communication using the IP address. Non-telephone communications such as Internet text chat communications, P-to-P VoIP communications, and/or MMS communications may be provided between the user terminal UT1 and the other user terminal.

A telephone number for user terminal UT2 may be entered into, provided at and/or selected from memory of user terminal UT1, and a user of user terminal UT1 may select one of a plurality of different communications functions (using different function keys, graphic menus, etc.). More particularly, the user terminal UT1 may allow selection of a telephone voice communication, an Internet text chat communication, a P-to-P VoIP communication, and/or a MMS communication. If a telephone communication is selected at block 301, a telephone voice communication may be initiated between the user terminals UT1 and UT2 without proceeding with operations of blocks 303, 305, and 307.

If a MMS communication is selected at block 301, user terminal UT1 may: initiate a circuit switched communication with user terminal UT2 at block 301 using the telephone number; receive an IP address for the MMS application of user terminal UT2 at block 303; terminate the circuit switched communication at block 305; and automatically initiate a MMS communication between the user terminals UT1 and UT2 at block 307. If an Internet text chat communication, a P-to-P VoIP communication, or other communication type that is not supported by user terminal UT2 is selected at block 301, user terminal UT2 may respond that the requested communication is not supported and/or the communication may be terminated.

A telephone number for user terminal UT3 may be entered into, provided at and/or selected from memory of user terminal UT1, and a user of user terminal UT1 may select one of a plurality of different communications functions (using different function keys, graphic menus, etc.). More particularly, the user terminal UT1 may allow selection of a telephone voice communication, an Internet text chat communication, a P-to-P VoIP communication, and/or a MMS communication. If a telephone communication is selected at block 301, a telephone voice communication may be initiated between the user terminals UT1 and UT3 without proceeding with operations of blocks 303, 305, and 307.

If a P-to-P VoIP communication is selected at block 301, user terminal UT1 may: initiate a circuit switched communication with user terminal UT3 at block 301 using the telephone number; receive an IP address for the P-to-P VoIP application of user terminal UT3 at block 303; terminate the circuit switched communication at block 305; and automatically initiate a P-to-P VoIP communication between the user terminals UT1 and UT3 at block 307. If an Internet text chat communication, an MMS communication, or other communication type that is not supported by user terminal UT3 is selected at block 301, user terminal UT3 may respond that the requested communication is not supported and/or the communication may be terminated.

A telephone number for user terminal UT4 may be entered into, provided at and/or selected from memory of user terminal UT1, and a user of user terminal UT1 may select one of a plurality of different communications functions (using different function keys, graphic menus, etc.). More particularly, the user terminal UT1 may allow selection of a telephone voice communication, an Internet text chat communication, a P-to-P VoIP communication, and/or a MMS communication. If a telephone communication is selected at block 301, a telephone voice communication may be initiated between the user terminals UT1 and UT4 without proceeding with operations of blocks 303, 305, and 307.

If an Internet text chat communication is selected at block 301, user terminal UT1 may: initiate a circuit switched communication with user terminal UT4 at block 301 using the telephone number; receive an IP address for the Internet text chat application of user terminal UT4 at block 303; terminate the circuit switched communication at block 305; and automatically initiate an Internet text chat communication between the user terminals UT1 and UT4 at block 307. If an MMS communication, a P-to-P VoIP communication, or other communication type that is not supported by user terminal UT4 is selected at block 301, user terminal UT4 may respond that the requested communication is not supported and/or the communication may be terminated.

A telephone number for user terminal UT5 may be entered into, provided at and/or selected from memory of user terminal UT1, and a user of user terminal UT1 may select one of a plurality of different communications functions (using different function keys, graphic menus, etc.). More particularly, the user terminal UT1 may allow selection of a telephone voice communication, an Internet text chat communication, a P-to-P VoIP communication, and/or a MMS communication. If a telephone communication is selected at block 301, a telephone voice communication may be initiated between the user terminals UT1 and UT5 without proceeding with operations of blocks 303, 305, and 307. If an MMS communication, an Internet text chat communication, a P-to-P VoIP communication, or other communication type that is not supported by user terminal UT5 is selected at block 301, user terminal UT5 may respond that the requested communication is not supported and/or the communication may be terminated.

A telephone number for user terminal UT6 may be entered into, provided at and/or selected from memory of user terminal UT1, and a user of user terminal UT1 may select one of a plurality of different communications functions (using different function keys, graphic menus, etc.). More particularly, the user terminal UT1 may allow selection of a telephone voice communication, an Internet text chat communication, a P-to-P VoIP communication, and/or a MMS communication. If a telephone communication is selected at block 301, a telephone voice communication may be initiated between the user terminals UT1 and UT6 (for example, using the client-server VoIP application of user terminal UT6) without proceeding with operations of blocks 303, 305, and 307.

If a P-to-P VoIP communication is selected at block 301, user terminal UT1 may: initiate a circuit switched communication with user terminal UT6 at block 301 using the telephone number; receive an IP address for the P-to-P VoIP application of user terminal UT6 at block 303; terminate the circuit switched communication at block 305; and automatically initiate a P-to-P VoIP communication between the user terminals UT1 and UT6 at block 307. If an Internet text chat communication, an MMS communication, or other communication type that is not supported by user terminal UT6 is selected at block 301, user terminal UT6 may respond that the requested communication is not supported and/or the communication may be terminated.

Figure 4:
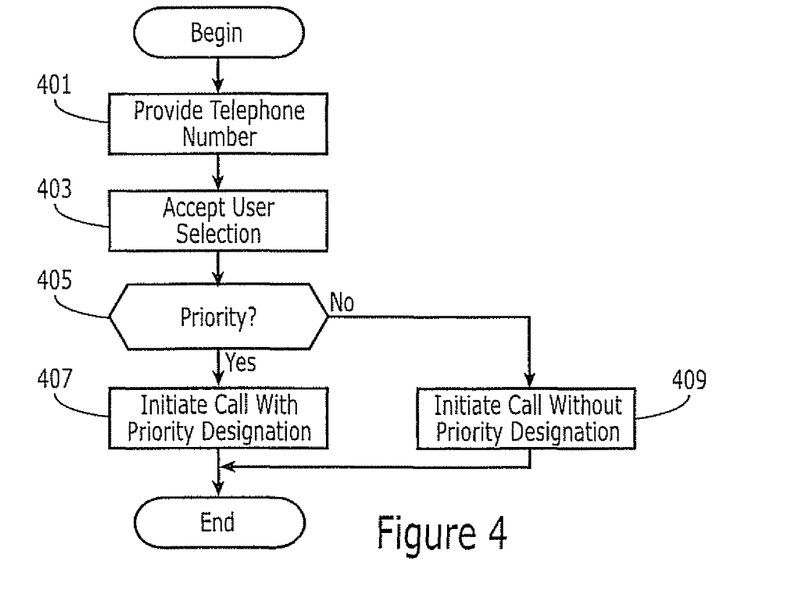

According to still other embodiments of the present invention shown in the flow chart of FIG. 4, user terminal UT1 may initiate a voice telephone communication with an indication of priority. More particularly, a telephone number may be provided at user terminal UT1 at block 401, and the telephone number may be for another user terminal (such as UT2, UT3, UT4, UT5, or UT6). The telephone number, for example, may be entered by a user of user terminal UT1, selected from memory of user terminal UT1, etc. Before initiating the call, user terminal UT1 may accept user selection of one of a normal call or a priority call at block 403. If a priority call is selected at block 405, a call to the other user terminal is initiated at block 407 using the telephone number so that a priority designation is provided at the other user terminal before the call is answered at the other user terminal. If a normal call selection is made at block 405, a call to the other user terminal is initiated at block 409 using the telephone number so that the priority designation is not provided at the second user terminal.

The priority designation may be transmitted, for example, from user terminal UT1 to the other user terminal over a paging channel and/or a signaling channel (such as a UUS channel). Moreover, the priority designation may include a text message such as a predefined text message selected from user terminal memory or a message entered by a user of the user terminal through a keypad or other input interface.

As discussed above, a called user terminal may be configured to respond to a call with a status message when in a DND or silent mode. The called user terminal, for example, may be configured to respond with a text message "In Meeting till 4:00" in response to a call so that the calling party will know when to call back. With the priority designation option discussed above with respect to FIG. 4, the calling party can call again with the priority designation. When the called party receives the second call while still in the meeting, the called party may choose to take the call after noting the priority designation.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of determining user terminal information, the method comprising:
    automatically initiating an automatically initiated first communication at a first user terminal between the first user terminal and a second user terminal using a telephone number of the second user terminal, wherein the automatically initiated first communication is automatically initiated at the first user terminal in response to occurrence of a time interval and without user input at the first user terminal;
    receiving information regarding the second user terminal at the first user terminal during the automatically initiated first communication over a non-voice channel from the second user terminal without opening a voice channel between the first and second user terminals, wherein the information regarding the second user terminal comprises an Internet Protocol (IP) address of the second user terminal and a user status profile designated by a user of the second user terminal; and
    responsive to receiving the Internet Protocol (IP) address, automatically initiating a second communication between the first and second user terminals using the Internet Protocol (IP) address of the second user terminal without requiring user input at the first user terminal after receiving the Internet Protocol (IP) address.

2. A method according to claim 1 wherein the user status profile comprises text designated by the user of the second user terminal.

3. A method according to claim 1 wherein the information regarding the second user terminal comprises an acknowledgement that the second user terminal supports an Internet Protocol (IP) application.

4. A method according to claim 1 wherein the telephone number of the second user terminal comprises a mobile serial number (MSN) of the user terminal.

5. A method according to claim 1 wherein the non-voice channel comprises a signaling channel provided during a circuit switched (CS) communication.

6. A method according to claim 1 wherein the automatically initiated first communication comprises a circuit switched (CS) telephone communication, the method further comprising:
    after receiving the information regarding the second user terminal during the circuit switched (CS) telephone communication, terminating the circuit switched telephone communication without alerting the user of the second user terminal.

7. A method according to claim 1
    wherein the method further comprises automatically initiating an automatically initiated third communication at the first user terminal between the first user terminal and a third user terminal in response to the occurrence of the time interval and without user input at the first user terminal, and
    wherein the method further comprises requesting user status profile updates from the second and third user terminals during the first and third communications, respectively.

8. A method of communication between first and second user terminals, the method comprising:
    initiating a first communication comprising a circuit switched communication between the first and second user terminals by selecting a non-telephone second communication comprising an Internet Protocol communication that is different from the first communication and by using a first identification of the second user terminal, in response to occurrence of a time interval and without user input at the first user terminal;
    receiving a second identification of the second user terminal at the first user terminal over a non-voice channel during the first communication wherein the first and second identifications are different;
    terminating the first communication after receiving the second identification of the second user terminal, wherein the second identification of the second user terminal comprises an Internet Protocol (IP) address of the second user terminal and a user status profile designated by a user of the second user terminal; and
    responsive to receiving the Internet Protocol (IP) address, automatically initiating the second communication between the first and second user terminals using the Internet Protocol (IP) address of the second user terminal without requiring user input at the first user terminal after receiving the Internet Protocol (IP) address.

9. A method according to claim 8 wherein the first and second identifications of the second user terminal are provided according to different formats.

10. A method according to claim 9 wherein the first identification of the second user terminal comprises a telephone number of the second user terminal.

11. A method according to claim 9 wherein the second identification of the second user terminal comprises an Internet Protocol (IP) address of the second user terminal.

12. A method according to claim 8 wherein the non-voice channel comprises a signaling channel provided during the circuit switched (CS) communication.

13. A method according to claim 8 wherein the second communication comprises a packet switched communication.

14. A method according to claim 8 wherein the first identification of the second user terminal comprises a telephone number of the second user terminal, wherein terminating the first communication comprises:
    after receiving the second identification of the second user terminal during the first circuit switched telephone communication, terminating the first circuit switched telephone communication without alerting the user of the second user terminal.

15. A method according to claim 8 wherein the first identification comprises a first telephone number of the second user terminal, wherein initiating the first communication comprises providing the first telephone number and accepting selection of the non-telephone communication using the first telephone number, the method further comprising;

accepting selection of a telephone communication using a second telephone number of a third user terminal; and establishing a telephone voice communication with the third user terminal.

16. A method according to claim 8 wherein the first identification of the second user terminal comprises a telephone number of the second user terminal, and wherein the second identification of the second user terminal comprises an Internet Protocol (IP) address of the second user terminal.

17. A method according to claim 8, wherein receiving the second identification of the second user terminal over the non-voice channel comprises receiving the second identification without opening a voice channel between the first and second user terminals.

18. A method of determining user terminal information, the method comprising:

automatically initiating an automatically initiated first communication at a first user terminal between the first user terminal and a second user terminal using a telephone number of the second user terminal, wherein the automatically initiated first communication is automatically initiated at the first user terminal in response to power up and without user input via a speaker, a microphone, a keypad, or a display at the first user terminal; and receiving information regarding the second user terminal at the first user terminal during the automatically initiated first communication over a non-voice channel from the second user terminal without opening a voice channel between the first and second user terminals, wherein the information regarding the second user terminal comprises an Internet Protocol (IP) address of the second user terminal and a user status profile designated by a user of the second user terminal; and responsive to receiving the Internet Protocol (IP) address, automatically initiating a second communication between the first and second user terminals using the Internet Protocol (IP) address of the second user terminal without requiring user input at the first user terminal after receiving the Internet Protocol (IP) address.

19. A method according to claim 18 wherein the automatically initiated first communication comprises a circuit switched (CS) telephone communication, the method further comprising:

after receiving the information regarding the second user terminal during the circuit switched (CS) telephone communication, terminating the circuit switched telephone communication without alerting the user of the second user terminal.

* * * * *